United States Patent
Nader et al.

(10) Patent No.: US 6,804,951 B2
(45) Date of Patent: Oct. 19, 2004

(54) ON-BOARD DIAGNOSTIC CATALYST MONITORING SYSTEM

(75) Inventors: David Robert Nader, Farmington Hills, MI (US); Michael Igor Kluzner, Oak Park, MI (US); Robert Eloy Gonzales, Royal Oak, MI (US); Robert Joseph Jerger, Dexter, MI (US); Ziad Zaghati, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,648

(22) Filed: Nov. 6, 2002

(65) Prior Publication Data

US 2004/0083720 A1 May 6, 2004

(51) Int. Cl.⁷ ............................................... F01N 3/00
(52) U.S. Cl. .............................. 60/277; 60/274; 60/276
(58) Field of Search ....................... 60/274, 276, 277, 60/285

(56) References Cited

U.S. PATENT DOCUMENTS

| | | |
|---|---|---|
| 3,969,932 A | 7/1976 | Rieger et al. |
| 5,018,348 A | 5/1991 | Durschmidt ................. 60/274 |
| 5,099,647 A | 3/1992 | Hamburg ..................... 60/274 |
| 5,255,515 A | 10/1993 | Blumenstock ............... 60/274 |
| 5,289,678 A | 3/1994 | Grutter |
| 5,335,538 A | 8/1994 | Blischke .................... 73/118.1 |
| 5,544,481 A | 8/1996 | Davey et al. |
| 5,644,912 A * | 7/1997 | Kawamura ................... 60/276 |
| 5,673,555 A | 10/1997 | Achleitner |
| 5,801,295 A | 9/1998 | Davey et al. |
| 5,865,026 A | 2/1999 | Davey et al. |
| 5,899,062 A | 5/1999 | Jerger et al. |
| 5,974,786 A | 11/1999 | Kluzner et al. |
| 6,082,101 A * | 7/2000 | Manaka et al. ............... 60/285 |
| 6,112,518 A | 9/2000 | Jerger et al. |
| 6,119,447 A * | 9/2000 | Eriksson et al. ............. 60/274 |
| 6,151,889 A | 11/2000 | Davey et al. |
| 6,195,986 B1 | 3/2001 | Davey et al. |
| 6,216,448 B1 | 4/2001 | Schnaibel et al. |
| 6,216,451 B1 | 4/2001 | Schnaibel ..................... 60/277 |
| 6,470,674 B1 * | 10/2002 | Yamaguchi et al. .......... 60/277 |
| 6,629,409 B2 * | 10/2003 | Lewis et al. .................. 60/285 |

OTHER PUBLICATIONS

N. Kurihara et al.; "An On–Board Diagnosis Method for Three–Way Catalyst Deterioration"; Society of Autom Engineers, Inc.; 1997; pp. 1–5..

Co–Pending U.S. patent application Ser. No. 10/062,384 filed Feb. 1, 2002.

* cited by examiner

Primary Examiner—Thomas Denion
Assistant Examiner—Diem Tran

(57) ABSTRACT

A method for determining the effectiveness of a catalyst to remove emissions from the exhaust of an internal combustion engine. The method includes measuring an upstream time history of a signal produced by an exhaust gas oxygen sensor upstream of the converter and a time history of an exhaust gas oxygen sensor disposed downstream of the converter. The time histories vary between a lean air-fuel ratio signal level and a rich air-fuel ratio signal level. A time delay is determined between the upstream time history and the downstream time history during transitions in such time histories from the lean air-fuel ratio signal level to the rich air-fuel ratio signal level. The determined time delay is compared with a reference time delay to determine the efficiency of the converter. The converter is determined to be ineffective if the converter as been determined to be potentially ineffective and the time delay is determined to be less than the reference time delay.

7 Claims, 5 Drawing Sheets

ON-BOARD DIAGNOSTIC CATALYST MONITORING SYSTEM

BACKGROUND AND SUMMARY OF INVENTION

The present invention relates to a method and system for determining the efficiency of a catalytic converter based on signals generated by pre-catalyst and post-catalyst exhaust gas oxygen sensors.

As is known in the art, increasingly stringent federal regulations limit the permissible levels for emissions. As such, vehicle manufacturers have developed various methods to reduce emissions while improving vehicle performance and fuel economy. Catalytic converters, positioned in the engine exhaust path, are often used to reduce emission levels of regulated exhaust gases. The conversion efficiency of a catalytic converter may be monitored using a pre-catalyst $O_2$ sensor positioned upstream from the catalytic converter and a post-catalyst $O_2$ sensor positioned downstream from the catalytic converter.

One method known for indicating conversion efficiency of the catalyst is to calculate a ratio of downstream sensor transitions or switches to upstream sensor transitions or switches. An increasing switch ratio is generally indicative of a degrading catalyst. When the switch ratio exceeds a threshold value, a malfunction indicator light (MIL) is illuminated so the vehicle operator will seek service. This method of catalyst monitoring is disclosed in Orzel U.S. Pat. No. 5,357,751, assigned to the assignee of the present invention, and is referred to as the Switch Ratio (SR) method. Another method for indicating conversion efficiency of the catalyst is based on the ratio of the arc lengths of the downstream sensor signal to the arc lengths of the upstream sensor signals identified as an Index Ratio (IR) method in contrast to the SR method. This method is disclosed in U.S. Pat. No. 5,899,062 Jerger et al, assigned to the assignee of the present invention, and incorporated herein by reference.

The test cycle for catalyst monitoring requires collection of data from each of the sensors while the engine is operating in each of a plurality of inducted airflow ranges or air mass (AM) cells. In each method a predetermined number of transitions or switches of the upstream sensor in each AM cell is required to complete the test cycle. These methods rely on AM cell calibration and assume that sensor signal transitions occurring in a defined AM cell are valid for ratio computation regardless of engine speed and load conditions. The determination of SR and IR based on data taken while the driver is operating the vehicle at a high load, low rpm or low load, high rpm condition results in increased SR and IR variability even though operation is within one of the plurality of inducted airflow ranges. The determination of catalyst conversion efficiency based solely on AM conditions may result in error, and may reduce the ability to discriminate between a good and a failed catalyst.

A method of detecting catalytic converter deterioration based on the ratio of the arc length or the number of transitions of signals from sensors upstream and downstream of the converter where ratio determination is restricted to predefined air mass ranges within corresponding predefined engine speed/load ranges in order to avoid areas of engine speed and load instability that might impair test to test repeatability of the deterioration detection is described in U.S. Pat. No. 6,195,986 assigned to the assignee of the present invention, and incorporated herein by reference.

The inventors have recognized that all presently known methods are designed to monitor total oxygen storage degradation using different upstream to downstream $O_2$ sensor signal calculations. Reference is made to co-pending patent application Ser. No. 10/062384, filed Feb. 1, 2002, inventors Nader et al., assigned to the same assignee as the present invention, the entire subject matter thereof being incorporated herein by reference. As described therein, oxygen storage can be found in two different catalyst wash coat components: Ceria (cerium oxides) and precious metal. Total oxygen storage availability is a function of the Ceria and precious metal content in wash coat and as well their dispersions and mutual locations (within the wash coat). The high $O_2$ storage (Ceria) catalyst has been the standard for monitoring starting in circa 1994 model years. Ceria is the weaker link in the wash coat when compared to the precious metal (PM). Ceria degrades sooner than does the PM when exposed to thermal or chemical (phosphorus) degrading. The current production\Index Ratio (IR) catalyst monitor measures the change in the lean $O_2$ sensor signal amplitude, as the catalyst ages. The rear $O_2$ sensor signal increases in activity as the catalyst loses ability to store oxygen. The Index monitor measures the catalyst $O_2$ storage (ceria) only and infers the emissions. The ratio of the rear $O_2$ sensor is compared to the front $O_2$ sensor, as the ratio approaches 1.0 the catalyst failed.

During the catalyst monitor calibration process, the emission and catalyst index relationship are established testing differently aged catalyst. The index vs. Tail Pipe FTP emission function typically referred as a "hockey stick curve". Monitoring the index in the field alloys to infer the catalyst "health" or tailpipe emission from catalyst index. The "slope" of the hockey stick curve is attributed to the loss of $O_2$ storage that is measured as an increase in the amplitude of the rear, or CMS $O_2$ sensor signal compared to the amplitude of front $O_2$ sensor signal. At the knee of the curve, basically all of cerium oxides (oxygen storage) are gone. After the knee the emissions are still increasing but the Index ratio is constant. This flat portion of the "hockey curve" is insensitive to the existing catalyst monitor. The catalyst has lost it's ability to storage oxygen (high Index ratio) yet has good emissions. The cerium oxides based oxygen storage is gone (very susceptible phosphorus contamination) while the precious metal based oxygen storage still stay untracked. This catalyst was phosphorous poisoned in the field and turned on the malfunction indicator light (MIL). The concern is that while the catalyst has lost it's ability to storage oxygen it may still be a very good emission catalyst. No longer is catalyst monitoring limited to a single measurement of $O_2$ storage. At the knee of the "hockey stick curve" the A/F signal amplitude entering and exiting the catalyst is almost the same. From this time on, the catalyst has no Ceria based $O_2$ storage. The precious metal(s) (PM) alone continues to degrade but still carry some $O_2$ storage due to affinity of oxygen and PM. The PM crystals grow larger (degrade) due to thermal aging thus reducing the active surface area and increase the emissions. The exhaust gas residency time or presence next to the active PM sites with some oxygen storage is the detectable (measured) metric, here time delay, $\tau$ (tau) or phase shift through the catalyst. On the flat portion of the hockey stick curve $\tau$ (tau) is still changing. $\tau$ (tau) is the transport delay (time) between the front and rear $O_2$ signals which measures the change of catalyst activity. As the (no Ce $O_2$ storage) catalyst degrades the value of $\tau$ (tau) decreases. The measurable $O_2$ sensor signal change for a catalyst as it ages to low or no cerium oxides based oxygen storage is the time constant $\tau$ (tau). Tau is the time, or transport, delay between the upstream and downstream) $O_2$ sensor signals. Tau or time delay varies at different rpm, loads, air mass and monitor volume for a given aged catalyst. However, τ decreases over time as the catalyst ages.

To put it another way, the inventors have recognized that the are two different types of material in the converter: one highly oxidizable (e.g., Ceria); and the other relatively less oxidizable. Thus, while increases in the amplitude of the oxygen sensed by the downstream converter indicates deterioration in the oxidizable material, and therefore its loss of effectiveness, there may still be effectiveness in the less oxidizable material performing the requisite emission reductions.

Applicants further recognized that the effectiveness of the less oxidizable material may be measured by measuring the time delay, or phase shift, between the signals produced by the upstream and downstream sensors. Thus, the applicants have determined that the effectiveness of each of the oxidizable and relatively non-oxidizable materials in the catalytic converter (i.e., the materials making up the catalyst) can be separately evaluated (i.e., measured independently); the former by the relative amplitudes between the oxygen before and after the catalyst; and, the latter by some other measurable parameter, such as time delay through the catalyst.

Further, the inventors have discovered that by measuring the time delay between the upstream and downstream oxygen sensors when such sensors transition from a lean condition to a rich condition, as distinguished from transitions from a rich condition to a lean condition, the reliability of the measurement of catalyst efficiency is improved.

In accordance with the present invention a method is provided for determining the effectiveness of a catalyst to remove emissions from such exhaust. The method includes measuring an upstream time history of a signal produced by an exhaust gas oxygen sensor upstream of the converter and a time history of an exhaust gas oxygen sensor disposed downstream of the converter. The time histories vary between a lean air-fuel ratio signal level and a rich air-fuel ratio signal level. A time delay is determined between the upstream time history and the downstream time history during transitions in such time histories from the lean air-fuel ratio signal level to the rich air-fuel ratio signal level. The determined time delay is compared with a reference time delay to determine the efficiency of the converter. The converter is determined to be ineffective if the converter as been determined to be potentially ineffective and the time delay is determined to be less than the reference time delay.

The details of one or more embodiments of the invention are set forth in the accompadrawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
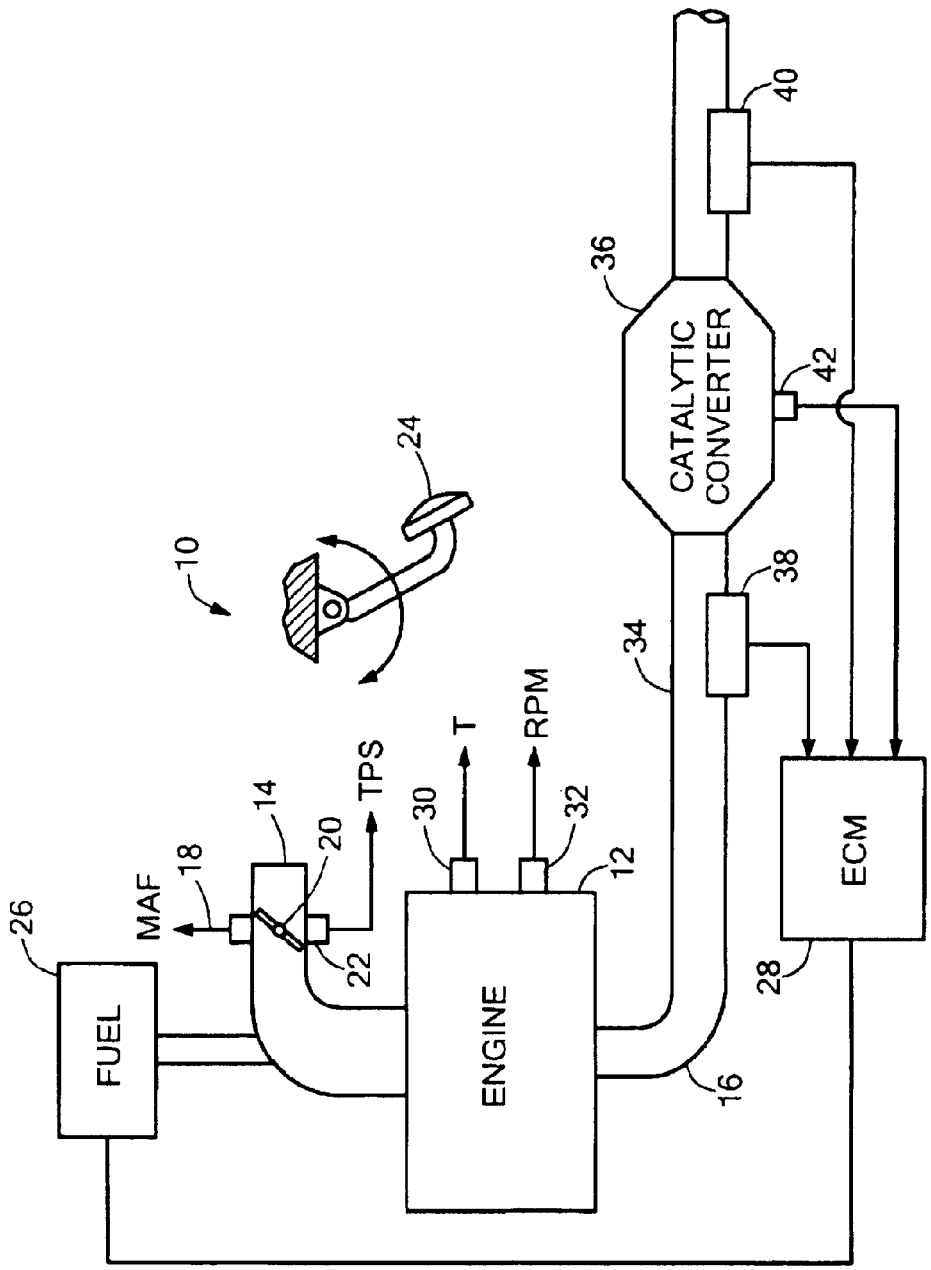
FIG. 1 is a block diagram of a system for monitoring catalytic converter effectiveness according to the invention.

Referring now to FIG. 1, a block diagram illustrating a system for monitoring performance or conversion efficiency of a catalytic converter is shown. System 10 includes an internal combustion engine 12 having an intake manifold 14 and exhaust manifold 16. Airflow through intake manifold 14 is measured by mass air flow (MAF) sensor 18 and regulated by throttle valve 20. A throttle position sensor 22 provides a signal (TPS) indicative of position of throttle valve 20 or an associated accelerator pedal 24. A conventional fuel supply 26 provides fuel, which is mixed with the air in intake manifold 14 to provide a combustion mixture, which is controlled by an engine controller, such as Engine Control Module (ECM) 28. An engine coolant temperature sensor 30, and an engine speed (RPM) sensor 32 communicates engine temperature and engine speed information respectively to the ECM 28. ECM 28 may also perform control and monitoring functions for various vehicle systems and subsystems in addition to controlling and monitoring engine 12.

An exhaust pipe 34 couples a catalytic converter 36, preferably a three-way converter (TWC) to the exhaust stream of engine 12. Catalytic converter 36 is monitored via an upstream (front) exhaust gas sensor 38 and a downstream (rear) exhaust gas sensor 40 each in communication with the engine controller 28. Upstream sensor 38 is located between engine 12 and catalytic converter 36 whereas downstream sensor 40 is located between catalytic converter 36 and the atmosphere. Upstream sensor 38 is preferably an exhaust gas oxygen sensor, commonly referred to as a HEGO sensor Downstream sensor 40 operates in a similar fashion as upstream sensor 38 but is commonly referred to as a catalyst monitor sensor (CMS) due to its intended function in the exhaust system. Any of a number of exhaust gas sensors may be utilized including lambda sensors, proportional oxygen sensors, and the like, to determine conversion efficiency of the converter according to the present invention. A catalytic converter temperature sensor 42 provides data to the ECM 28 regarding converter temperature. Alternatively, the converter temperature may be inferred, from other sensor data in order to avoid the cost of an additional dedicated temperature sensor. Various other sensors communicate with ECM 28 to facilitate control and monitoring functions. These sensors may include an EGR sensor or other device for exhaust gas recirculation monitoring.

The ECM 28 includes a microprocessor and various computer readable storage media, which may include but is not limited to a read only memory (ROM), a random access memory (RAM), and a keep-alive memory (KAM). The computer readable storage media may be implemented by any of a number of known volatile and nonvolatile storage devices including but not limited to PROM, EPROM, EEPROM, flash memory, and the like, all of which are well known in the art. RAM is typically used for temporary data storage of various operating variables which are lost when the engine ignition is turned off, such as counters, timers, status flags, and the like. KAM is generally used to store learned or adaptive values which may change over time. The contents of KAM are maintained as long as some power is provided to ECM 28. Preferably, one or more ROMs within ECM 28 contains control logic implemented by program instructions executed by the microprocessor along with various system parameter values and calibrations.

The ECM 28 receives signals from upstream and downstream exhaust gas sensors 38 and 40, respectively, which reflect current operating conditions of engine 12 and converter 36. For example, when at or above operating temperature, upstream sensor 38 provides a continuous signal (preferably a voltage) to ECM 28 based on the presence or absence of oxygen in exhaust pipe 34. The voltage signal is indicative of the excursion from the stoichiometric combustion mixture of the exhaust gases in exhaust manifold 16. The upstream sensor signal is a two-state signal having a predetermined high voltage when exhaust gases indicate a rich mixture and a predetermined low voltage when exhaust gases indicate a lean mixture. Downstream sensor 40 monitors catalytic converter 36 by detecting the presence or absence of oxygen downstream from converter 36 and provides a voltage signal to ECM 28.

The ECM 28 uses control logic implemented in hardware and/or software to generate various signals to control and monitor operation of engine 12. For example, controller 28 generates an output signal to electronic fuel injectors, represented by fuel supply 24, to control the quantity and timing of fuel delivered to engine 12 in response to a feedback variable derived from an output of the upstream sensor 38.

In the present invention, the ECM 28 is also used to monitor performance of catalytic converter 36 using the signals from upstream sensor 38 and downstream sensor 40. The sensor signals are filtered, periodically sampled, and stored within ECM 28 to monitor performance of catalytic converter 36. The amplitude variation or excursion of the signal of the downstream sensor 40 is much less than that of the signal from the upstream sensor 38 due to the operation of the catalytic converter in converting the exhaust gases. As such, catalyst monitors that rely on amplitude variation of the downstream sensor signal are less sensitive to variations induced by catalyst degradation. In contrast, the index ratio metric is based on the arc-length of the signal and the incorporation of a time-based or horizontal component of the sensor signal produces superior sensitivity as explained in the aforementioned U.S. Pat. No. 5,899,062.

Figure 2A:
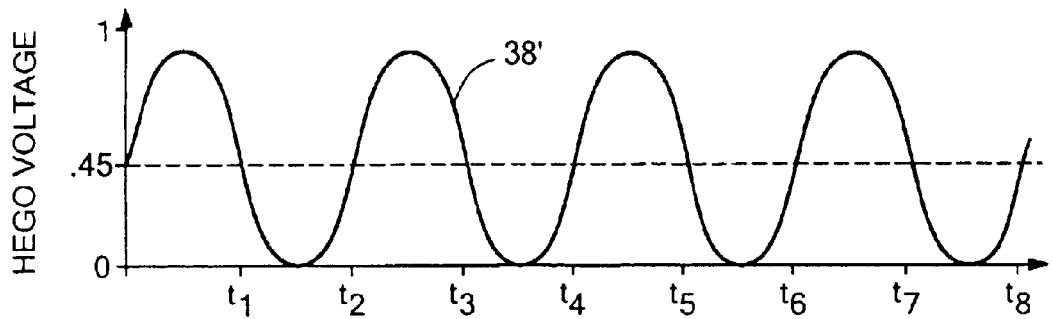
FIG. 2A is a graph of a signal produced by the exhaust gas oxygen sensor disposed upstream of the converter as a function of time.
Figure 2B:
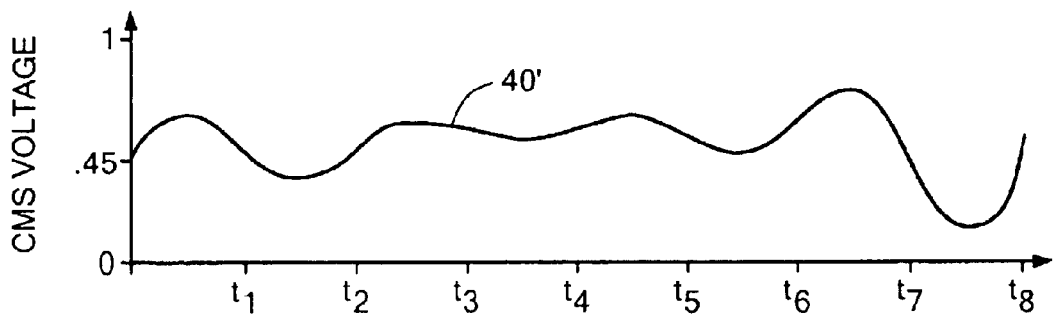
FIG. 2B is a graph of a signal produced by the exhaust gas oxygen sensor disposed downstream of the converter for a catalytic converter having a high exhaust gas conversion efficiency.
Figure 2C:
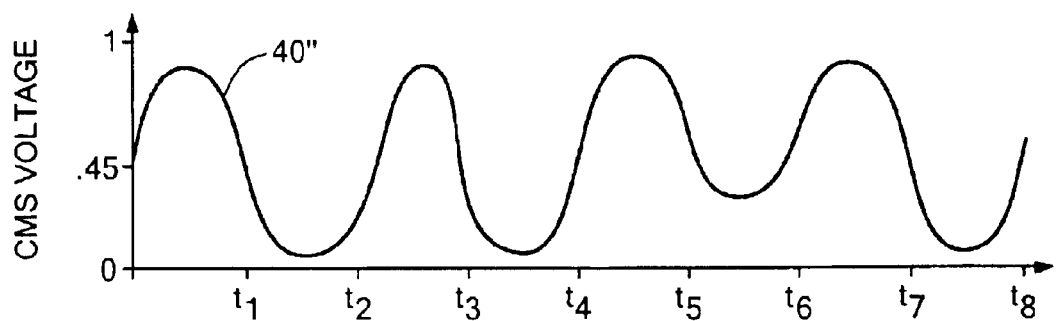
FIG. 2C as graph of a signal produced by the exhaust gas oxygen sensor disposed downstream of the converter for a catalytic converter more aged than the converter producing the signal shown in FIG. 2B.

Referring now to FIGS. 2A–2C, representative voltage signals generated by sensors 38 and 40 are shown. FIG. 2A illustrates an upstream voltage signal 38' from HEGO sensor 38 as a function of time. The voltage 38' from upstream sensor 38 oscillates through a switch point of 0.45 volts between a high voltage and a low voltage in response to the combustion mixture oscillating about the stoichiometric ratio during closed loop control.

FIG. 2B shows a representative voltage 40' from downstream sensor 40 as a function of time for a catalyst having a relatively high conversion efficiency. Although the frequency of downstream signal 40' is the same as the frequency of upstream signal 38', downstream signal 40' has a much different variation in amplitude than upstream signal 38' and is time delayed due to the propagation delay of exhaust gases passing through the converter 36. The amplitude variation or excursion of downstream signal 40' is much less than that of upstream signal 38' to the operation of the catalytic converter in converting the exhaust gases. As such described in the above referenced U.S. Pat. No. 5,899,062, the arc length measuring and ratio method described therein incorporates the time-based or horizontal component of the sensor signal into the catalyst efficiency indicator.

FIG. 2C illustrates a representative downstream voltage signal 40" provided by CMS sensor 40 as a function of time. In this case, the amplitude variation of downstream signal 40" is much greater than the variation of downstream signal 40' because the Cerium oxides in the catalyst 36 has been highly oxidized and no longer "absorbs"(i.e., reacts with) oxygen in the exhaust fed to the catalyst. Thus, the arc length ratio described in U. S. Pat. No. 5,899,062 is nearly unity. Detection of this nearly unity arc length ratio while indicating that the Cerium oxides are no longer effective in reducing emissions, does not provide any indication as to whether the precious metals in the catalyst 36 are effective in reducing emissions to within governmental regulations.

Applicants have recognized that detection of the time delay through the catalyst of the signals produced by the upstream and downstream sensors 38 and 40 provides a measure of the effectiveness of the precious metals reduction of emissions.

More particularly, referring to FIGS. 2A–2C as noted above FIG. 2B shows the voltage produced by the downstream sensor 40 after the Cerium has lost its effectiveness. Under such condition, there is a reduction in the time delay between the signals produced by the upstream and downstream sensors. Applicants have measured the time delay between such upstream and downstream signal using a new, or green catalyst "poisoned" by phosphorous to remove any emission removal effectiveness of the Cerium oxides. Applicants have determined that this green, or new catalyst is still able to reduce emissions to acceptable levels because of the precious metals in the catalyst. They first measure the time delay of the green but poisoned catalyst. After many additional hours of use, this now aged catalyst has its emission reduction effectiveness measured along with the time delay between the upstream and downstream sensor 38, 40 output signal. The process continued until the catalyst is no longer effective, i.e., the precious metals have lost their effectiveness in removing emissions such that the catalyst no longer met governmental requirement. At this time, the time delay $\tau$, between the upstream and downstream sensors 38, 40 is measured. This measured time delay $\tau$ becomes a measure of a minimum time delay threshold such that if the actual time delay of a catalyst falls below this level $\tau$, the catalyst is deemed to be ineffective and the MIL is activated.

Figure 3:
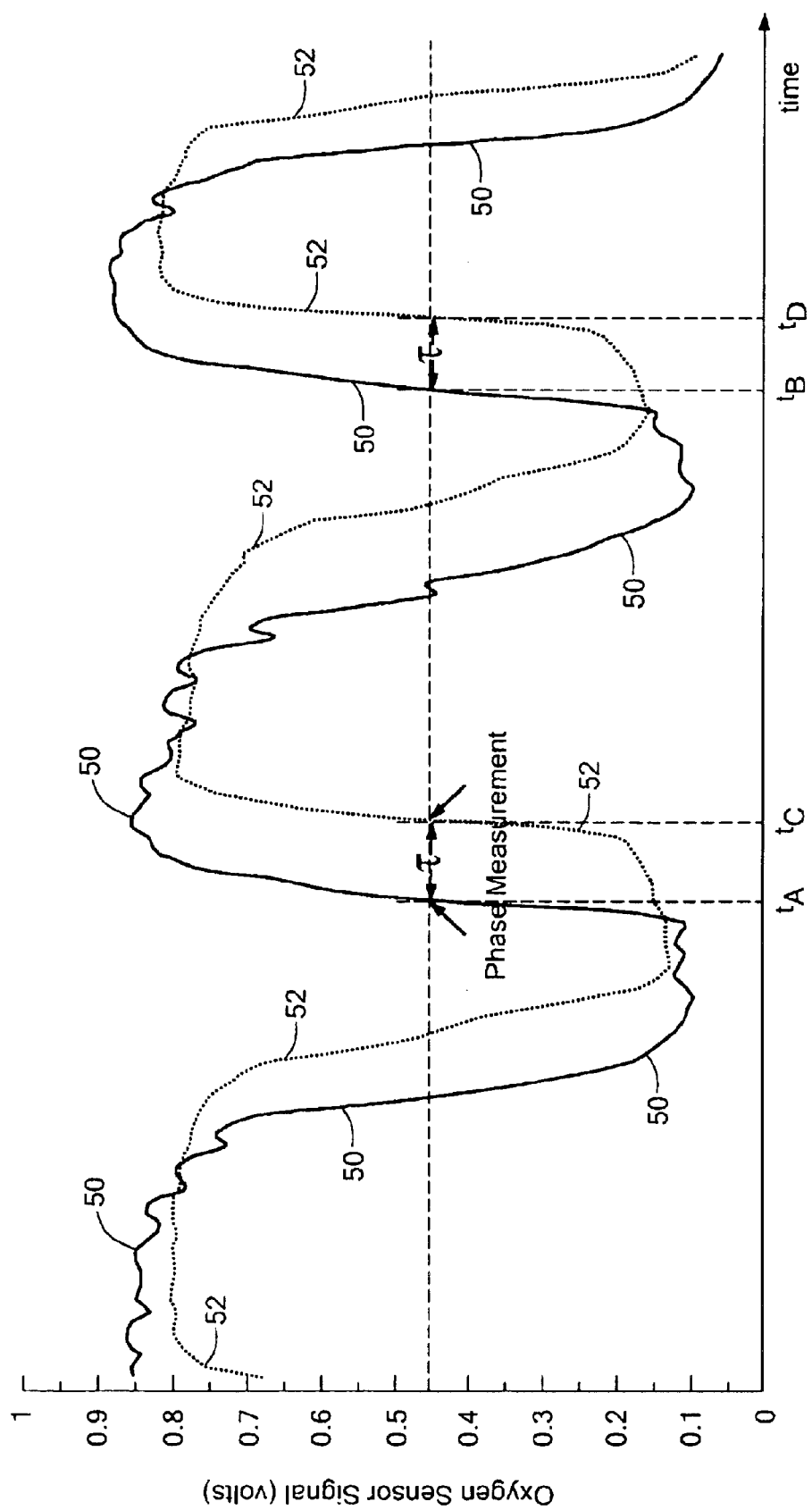
FIG. 3 are curves showing the time history of the upstream exhaust gas oxygen sensor of the a catalytic converter and t the time history of the downstream exhaust gas oxygen sensor of the same catalytic converter, such curves being shown with the same time reference.

The time delay may be determined a number of different ways. Here, a determination is made by measuring the time delay between: (1) the time the upstream exhaust gas oxygen sensor 38 voltage output, shown by curve 50, passes through a reference level, or setpoint, here 0.45 during transitions from a lean air fuel ratio to a rich air fuel ratio, e.g., at times tA, tB in FIG. 3; and, (2) the time the downstream exhaust gas oxygen sensor 40 voltage output, shown by curve 52, passes through the same reference level, or setpoint, here 0.45, during transitions from a lean air fuel ratio to a rich air fuel ratio, e.g., at times tC, tD in FIG. 3. Thus, the lean to rich time delay between tA and tC is a measure of $\tau$.

Likewise a succeeding rich to lean measure of τ is the time between tB and tC.

Other methods may be used to determine τ such as those described in the co-pending patent application Ser. No. 10/062384 referred to above.

Figure 4:
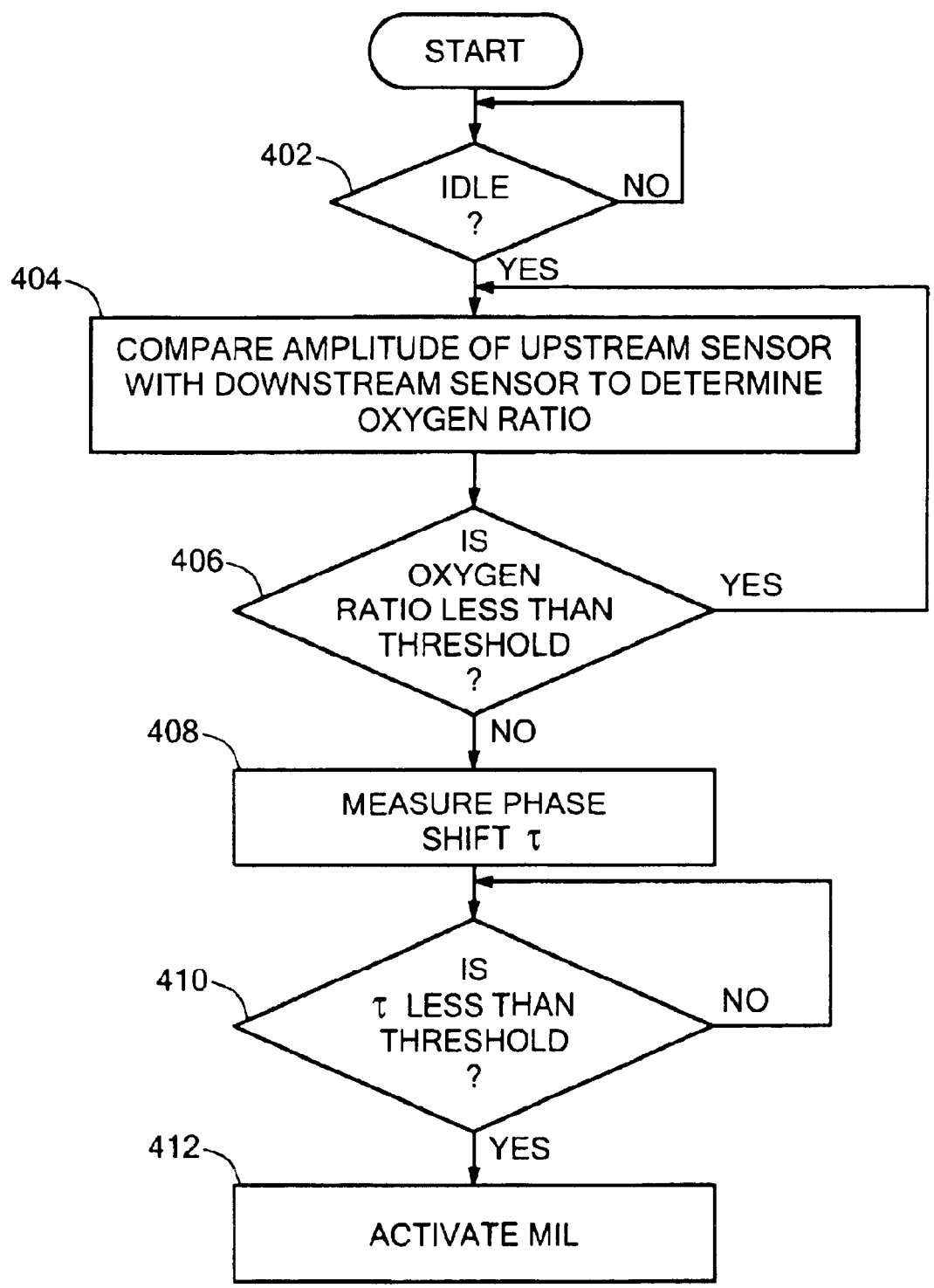
FIG. 4 is a flow diagram of the method for evaluating the effectiveness of a catalytic converter according to the invention.

Referring now to FIG. 4 the method described above is summarized in the flow diagram shown. Thus, when the engine is at some predetermined operating condition, here idle the test is performed (Step 402). First a comparison is made between the signals produced by the upstream and downstream oxygen exhaust sensors and the ECM processes such signal to determine the oxygen ratio of the oxygen in the downstream of the converter to the oxygen in the exhaust upstream of the converter, Step 404. If the ratio is less than a predetermined threshold (Step 406), the converter is effective and the process continues to make such comparison (returns to Step 404). If, on the other hand the ratio is less than the threshold, the time delay between the upstream and downstream oxygen exhaust sensors is measured (Step 408). The time delays, τ, are determined using lean to rich transitions, i.e., time delay between tA and tC and rich to lean transitions time delay between tB and tD in FIG. 3.

If the measured time delay is greater than a predetermined threshold, the time delay, τ, measurement continues, Step 410. On the other hand if the time delay is less than such predetermined threshold, the catalytic converter is deemed ineffective and the MIL is activated, Step 412.

Figure 5:
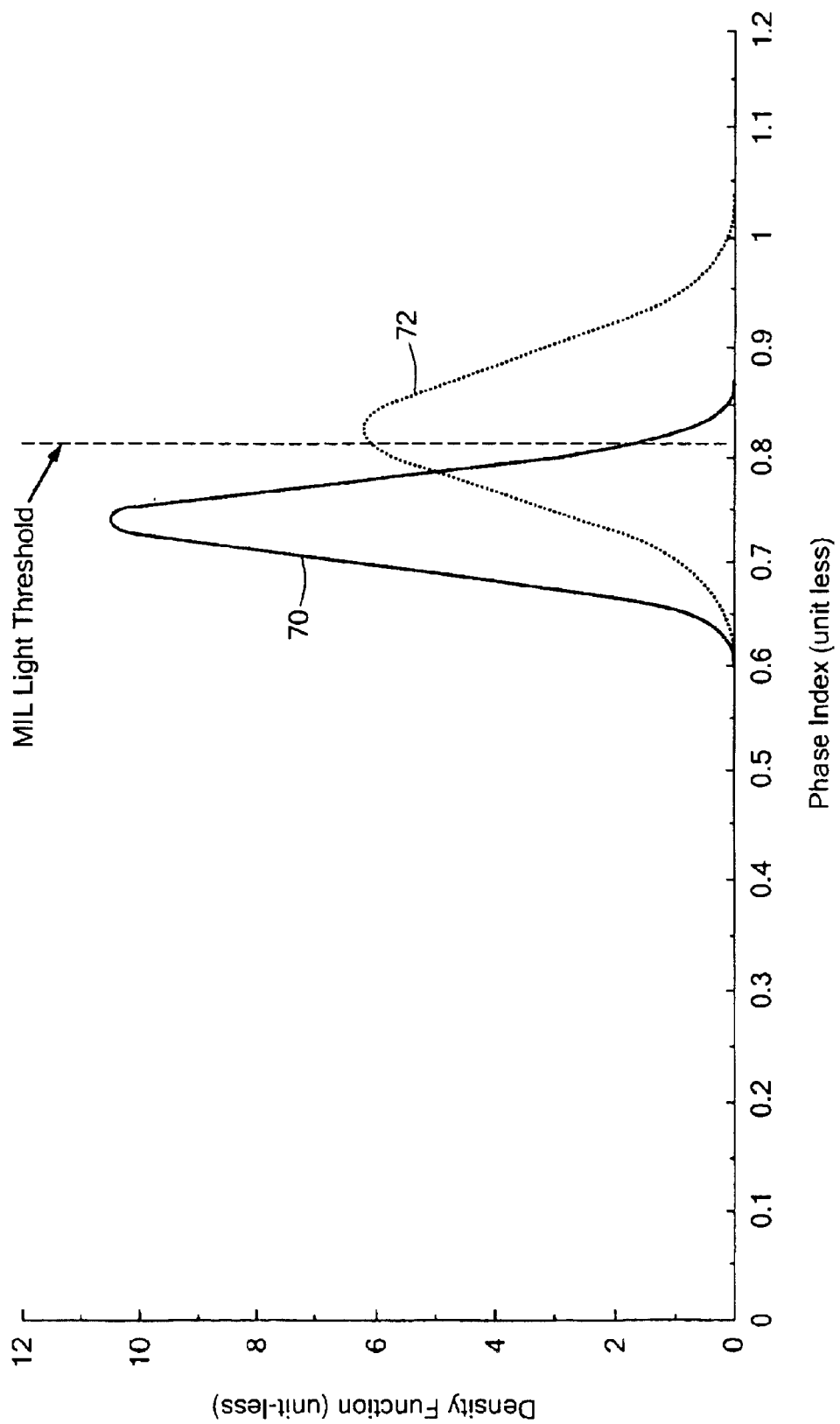
FIG. 5 shows statistical distributions differences between the measured average phase shifts for a catalytic converter having low emissions conversion effectiveness, determined using time delay measurements during lean to rich and rich to lean transitions of the upstream and downstream oxygen sensors.

Referring to FIG. 5, shows statistical distributions differences between the measured average lean to rich (L/R) transition phase shift (70) and rich to lean R/L transition phase shift (72) for a catalytic converter having low emissions conversion effectiveness, determined by using time delay measurements during lean to rich or rich to lean, transitions of the upstream and downstream oxygen sensors.

It is noted that there is less measurement deviation when using the time delay measurements between during lean to rich transitions of the upstream and downstream oxygen sensors, curve 70, than that using the time delay measurements between rich to lean transitions, curve 72. Further, there are statistically less MIL indications less when using the time delay measurements between during lean to rich transitions of the upstream and downstream oxygen sensors, curve 70, than that using the time delay measurements between rich to lean transitions, curve 72.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining the effectiveness of a catalyst having both first, relatively high oxidizable material provided to remove emissions from the exhaust of an internal combustion engine and a second, relatively low oxidizable material provided to remove emissions from such exhaust, such method comprising:

measuring an upstream time history of a signal produced by an exhaust gas oxygen sensor upstream of the converter and a time history of an exhaust gas oxygen sensor disposed downstream of the converter, such time histories having first transitions when the time history varies between a lean air-fuel ratio signal level and a rich air-fuel ratio signal level and having second transitions when the time history varies between a rich air-fuel ratio signal level and a lean air-fuel ratio signal level;

determining a time delay between only the first transitions in the upstream time history and the downstream time history;

comparing the determined time delay with a reference time delay to determine the efficiency of the converter;

determining the effectiveness of the converter from such comparison.

2. The method recited in claim 1 wherein a predetermined value is between two operating stoichiometric ratios.

3. The method recited in claim 2 wherein the converter includes an oxidizable material and a precious metal material.

4. A method for determining the effectiveness of a catalyst having both first, relatively high oxidizable material provided to remove emissions from the exhaust of an internal combustion engine and a second, relatively low oxidizable material provided to remove emissions from such exhaust, such method comprising:

generating a first signal indicative of an exhaust gas air fuel ratio relative to stoichiometry upstream of the converter, such first signal having first transitions when the first signal varies between a lean air-fuel ratio signal level and a rich air-fuel ratio signal level and having second transitions when the first signal varies between a rich air-fuel ratio signal level and a lean air-fuel ratio signal level;

generating a second signal indicative of an exhaust gas air fuel ratio relative to stoichiometry downstream of the converter, such second signal having a first transition when the second signal varies between a lean air-fuel ratio signal level and a rich air-fuel ratio signal level and second transition when the second signal varies between a rich air-fuel ratio signal level and a lean air-fuel ratio signal level;

determining said first time when the first signal has a first transitions from a lean to rich air fuel ratio relative stoichiometry;

determining said second time when the second signal has a first transition from a lean to rich air fuel ratio relative stoichiometry;

determining a catalyst operating efficiency based on the difference between the first and second times, such determining being independent of a time delay between the second transition of the first signal and the second transition of the second signal.

5. The method recited in claim 4 wherein the converter includes an oxidizable material and a precious metal material.

6. A method for determining the effectiveness of a catalyst having both first, relatively high oxidizable material provided to remove emissions from the exhaust of an internal combustion engine and a second, relatively low oxidizable material provided to remove emissions from such exhaust, such method comprising:

measuring an upstream time history of a signal produced by an exhaust gas oxygen sensor upstream of the converter and a time history of an exhaust gas oxygen sensor disposed downstream of the converter, such time histories having first transitions when such time history varies between a lean air-fuel ratio signal level and a rich air-fuel ratio signal level and second transitions when such time history varies between a rich air-fuel ratio signal level and a lean air-fuel ratio signal level;

determining a time delay between the upstream time history and the downstream time history during the first transitions;

comparing the determined time delay with a reference time delay to determine the efficiency of the converter;

determining the effectiveness of the converter from such comparison independent of the second transitions.

7. A system for determining the effectiveness of a catalyst having both first, relatively high oxidizable material provided to remove emissions from the exhaust of an internal combustion engine and a second, relatively low oxidizable material provided to remove emissions from such exhaust, such system comprising:

a first sensor for generating a first signal indicative of an exhaust gas air fuel ratio relative to stoichiometry upstream of the converter, such first signal having first transitions when the first signal varies between a lean air-fuel ratio signal level and a rich air-fuel ratio signal level and having second transitions when the first signal varies between a rich air-fuel ratio signal level and a lean air-fuel ratio signal level;

a second sensor for generating a second signal indicative of an exhaust gas air fuel ratio relative to stoichiometry downstream of the converter, such second signal having a first transition when the second signal varies between a lean air-fuel ratio signal level and a rich air-fuel ratio signal level and second transition when the second signal varies between a rich air-fuel ratio signal level and a lean air-fuel ratio signal level;

a processors for determining a first time when the first signal has a first transitions from a lean to rich air fuel ratio relative stoichiometry, for determining a second time when the second signal has a first transitions from a lean to rich air fuel ratio relative stoichiometry and for determining a catalyst operating efficiency based on the difference between the first and second times, such determining being independent of a time delay between the second transition of the first signal and the second transition of the second signal.

* * * * *